United States Patent
Arai et al.

(10) Patent No.: US 9,488,146 B2
(45) Date of Patent: Nov. 8, 2016

(54) CONTROL APPARATUS FOR GENERAL-PURPOSE INTERNAL COMBUSTION ENGINE

(71) Applicant: HONDA MOTOR CO., LTD., Tokyo (JP)

(72) Inventors: Tetsuya Arai, Wako (JP); Toyokazu Kawasaki, Wako (JP); Akihito Kasai, Wako (JP); Kentaro Taniguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 14/231,934

(22) Filed: Apr. 1, 2014

(65) Prior Publication Data

US 2014/0299095 A1 Oct. 9, 2014

(30) Foreign Application Priority Data

Apr. 9, 2013 (JP) .................. 2013-081125

(51) Int. Cl.
*F02N 3/02* (2006.01)
*F02P 1/08* (2006.01)
(Continued)

(52) U.S. Cl.
CPC . *F02N 3/02* (2013.01); *F02P 1/08* (2013.01); *F02P 1/083* (2013.01); *F02P 5/1506* (2013.01);
(Continued)

(58) Field of Classification Search
CPC ............... F02N 3/02; F02N 2250/06; F02N 2300/102; F02P 1/08; F02P 5/1506; F02P 5/1558; F02P 5/04; F02P 5/06; F02P 5/14; F02B 63/02; F02D 9/1025; F02D 41/062; F02D 2011/104; F02D 2200/101; F16D 43/18; F02M 1/02; F02M 1/10; H02K 21/48; Y02T 10/46

USPC ............... 123/343, 179.28, 149 FA, 406.56, 123/406.76, 406.75, 406.52, 406.12, 123/406.36, 399; 701/101
See application file for complete search history.

(56) References Cited

U.S. PATENT DOCUMENTS 4,021,677 A * 5/1977 Rosen ...................... B60K 6/48
180/65.25
4,455,492 A * 6/1984 Guelpa .................. B60K 6/485
180/65.26
(Continued)

FOREIGN PATENT DOCUMENTS

EP 1496249 A1 1/2005
EP 2042727 A1 4/2009
(Continued)

OTHER PUBLICATIONS

European Search Report dated Sep. 5, 2014, issued in corresponding EP application No. 14163952 (2 pages).

*Primary Examiner* — Stephen K Cronin
*Assistant Examiner* — Susan E Scharpf
(74) *Attorney, Agent, or Firm* — Westerman, Hattori, Daniels & Adrian, LLP

(57) ABSTRACT

In a control apparatus for a general-purpose internal combustion engine including a generator as a power supply, the generator includes a main generator coil supplying power to the stepping motor, and an auxiliary generator coil supplying power to an ignition device of the engine. The apparatus includes ignition timing controller for, when starting the engine by a manual starter, detecting that an engine speed reaches or exceeds a predetermined engine speed not exceeding a connecting rotation speed of a centrifugal clutch to retard an ignition timing of the engine, thereby suppressing increase in the engine speed to less than the connecting rotation speed, and for restoring the ignition timing to its normal timing after a predetermined time elapses from start of retarding the ignition timing. Accordingly, it suppresses overshooting of an engine speed above the connecting rotation speed even if a delay occurs in closing a throttle valve by a delay in activating the motor.

2 Claims, 6 Drawing Sheets

(51) Int. Cl.
*F02P 5/15*       (2006.01)
*F02P 5/155*      (2006.01)
*F02M 1/02*       (2006.01)
*F02M 1/10*       (2006.01)
*F02D 11/10*      (2006.01)
*F02D 41/06*      (2006.01)
*F02B 63/02*      (2006.01)

(52) U.S. Cl.
CPC .............. *F02P 5/1558* (2013.01); *F02B 63/02* (2013.01); *F02D 41/062* (2013.01); *F02D 2011/104* (2013.01); *F02D 2200/101* (2013.01); *F02M 1/02* (2013.01); *F02M 1/10* (2013.01); *F02N 2250/06* (2013.01); *F02N 2300/102* (2013.01); *Y02T 10/46* (2013.01)

(56) References Cited

U.S. PATENT DOCUMENTS

| | | | | |
|---|---|---|---|---|
| 6,494,188 B1* | 12/2002 | Kanno | ................... | F01L 1/0532 123/491 |
| 6,534,958 B1* | 3/2003 | Graber | ................... | F02B 63/04 123/2 |
| 6,834,632 B2* | 12/2004 | Kataoka | ............. | F02N 11/0814 123/179.28 |
| 6,973,911 B2* | 12/2005 | Yamashita | ............. | F02P 1/086 123/335 |
| 7,077,713 B2* | 7/2006 | Watabe | ............. | A61K 31/7088 440/1 |
| 7,198,028 B2* | 4/2007 | Andersson | ............ | F02P 5/1504 123/339.11 |
| 7,311,084 B2* | 12/2007 | Begg | ....................... | F02D 41/34 123/476 |
| 7,381,009 B2* | 6/2008 | Jenkins | ................... | E04F 21/24 404/112 |
| 7,395,794 B2* | 7/2008 | Tamamoto | ................ | F02N 3/02 123/179.28 |
| 7,882,817 B2* | 2/2011 | Yamazaki | ................. | F02N 3/02 123/185.2 |
| 8,055,434 B2* | 11/2011 | Sasaki | ................... | F02D 41/062 123/179.28 |
| 2008/0011272 A1* | 1/2008 | Bengtsson | .............. | F02P 1/086 123/406.56 |
| 2009/0050092 A1* | 2/2009 | Handa | ................. | F02N 11/0866 123/179.3 |
| 2009/0293845 A1* | 12/2009 | Matsuda | ................... | F02D 9/02 123/462 |
| 2010/0012084 A1 | 1/2010 | Andersson et al. | | |
| 2010/0147544 A1* | 6/2010 | Yoshizaki | ............... | F02D 11/04 173/176 |
| 2012/0161341 A1 | 6/2012 | Arai | | |
| 2012/0193112 A1* | 8/2012 | Gwosdz | ............... | F02D 31/009 173/1 |
| 2013/0180491 A1* | 7/2013 | Detels | ........................ | F02P 3/02 123/179.28 |
| 2014/0230787 A1* | 8/2014 | Mezaki | ................... | B27B 17/083 123/406.52 |

FOREIGN PATENT DOCUMENTS

| | | |
|---|---|---|
| EP | 2058924 A2 | 5/2009 |
| EP | 2472086 A1 | 7/2012 |
| EP | 2481905 A1 | 8/2012 |
| JP | 2012-140878 A | 7/2012 |
| WO | 2009/085006 A1 | 7/2009 |
| WO | 2013/027689 A1 | 2/2013 |

* cited by examiner

Ne: ENGINE SPEED
Np: NUMBER OF PULSES GENERATED
    BY AUXILIARY GENERATOR COIL

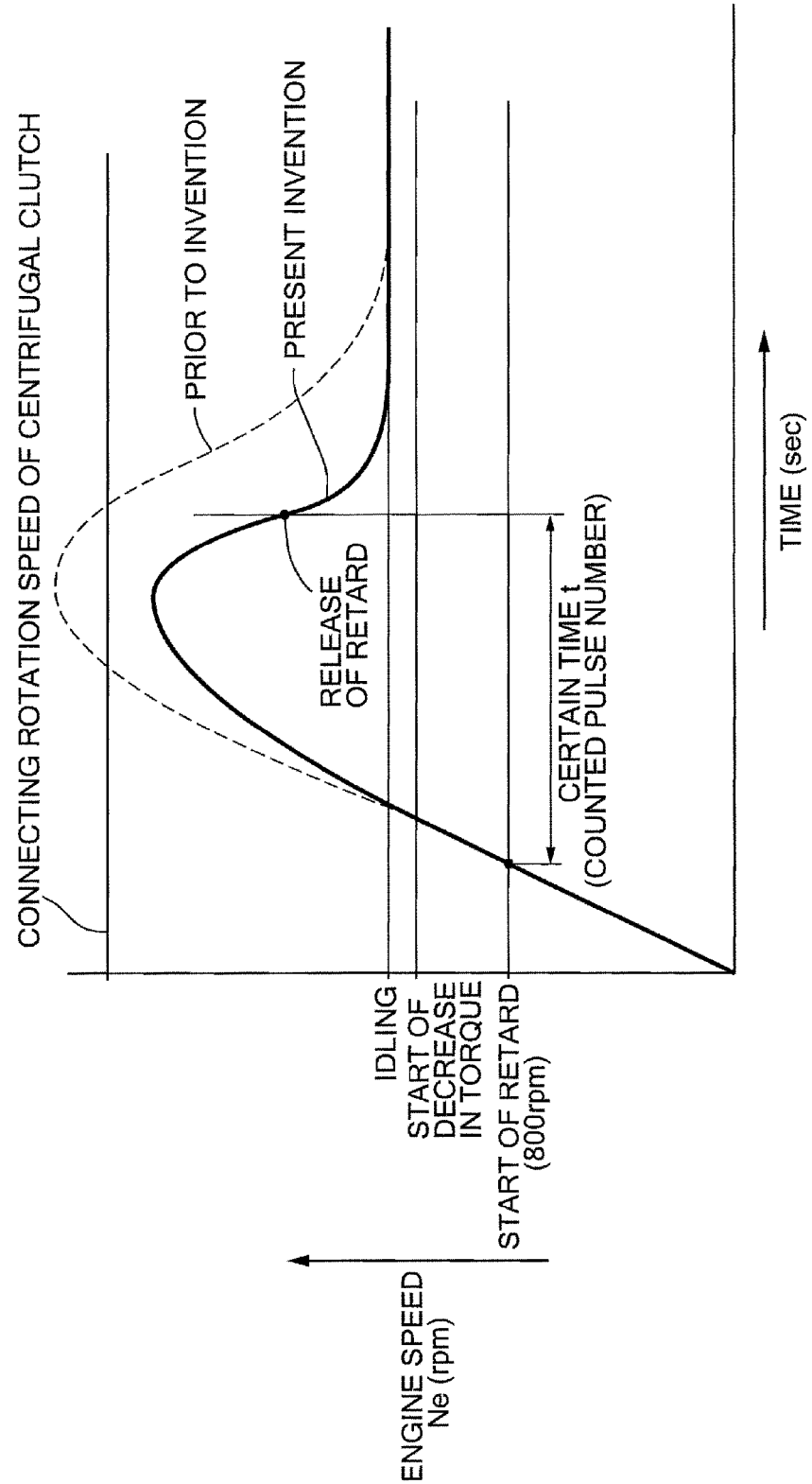

CONTROL APPARATUS FOR GENERAL-PURPOSE INTERNAL COMBUSTION ENGINE

BACKGROUND OF THE INVENTION

1. Field of the Invention

The present invention relates to an improvement of a control apparatus for a general-purpose internal combustion engine having an output shaft connected via a centrifugal clutch to a load device, the control apparatus comprising a manual starter, a carburetor having a throttle valve for opening and closing an intake passage, and a stepping motor for controlling opening and closing of the throttle valve, in which the internal combustion engine is started from a full-open position of the throttle valve and, after the start of the engine, the stepping motor is activated so as to close the throttle valve from the full-open position.

2. Description of the Related Art

Such a control apparatus for a general-purpose internal combustion engine is known as disclosed in, for example, Japanese Patent Application Laid-open No. 2012-140878.

SUMMARY OF THE INVENTION

With the control apparatus for a general-purpose internal combustion engine disclosed in Japanese Patent Application Laid-open No. 2012-140878, the engine includes a battery as a power supply and thus, after start of the engine, a stepping motor is immediately activated by electric power from the battery to close a throttle valve to a predetermined opening, which thus enables suppressing that an engine speed overshoots to or more a connecting rotation speed of a centrifugal clutch. However, in the case of an internal combustion engine including a generator without having the battery as the power supply, a slow rise in an output from the generator, when starting the engine by a manual starter, may cause a delay in activation of the stepping motor and hence a delay in closing of the throttle valve, thus leading to the engine speed overshooting above the connecting rotation speed of the centrifugal clutch. Accordingly, engine stall may occur by connection shock of the centrifugal clutch.

The present invention has been made in view of the above-mentioned circumstances. An object of the present invention is to provide a control apparatus for a general-purpose internal combustion engine including a generator as a power supply, in which, even if a delay in closing of a throttle valve is caused by a delay in activation of a stepping motor when starting the engine by a manual starter, the engine can be surely started by suppressing overshooting of an engine speed above a connecting rotation speed of a centrifugal clutch and after starting the engine, the engine speed can be stabilized at an idling speed.

In order to achieve the object, according to a first aspect of the present invention, there is provided a control apparatus for a general-purpose internal combustion engine having an output shaft connected via a centrifugal clutch to a load device, the control apparatus comprising a manual starter, a carburetor having a throttle valve for opening and closing an intake passage, and a stepping motor for controlling opening and closing of the throttle valve, in which the internal combustion engine is started from a full-open position of the throttle valve and, after the start of the engine, the stepping motor is activated so as to close the throttle valve from the full-open position, wherein the control apparatus further comprises: a generator as a power supply of the engine, the generator including a main generator coil for supplying power to the stepping motor, and an auxiliary generator coil for supplying power to an ignition device of the engine; and ignition timing control means for, when starting the engine by a manual starter, detecting that an engine speed of the engine is equal to or more than a predetermined engine speed which is equal to or less than a connecting rotation speed of the centrifugal clutch, and retarding an ignition timing of the engine so as to suppress increase in the engine speed of the engine to less than the connecting rotation speed of the centrifugal clutch, and also for restoring the ignition timing to its normal timing after a lapse of a predetermined time from start of retarding the ignition timing.

According to the first aspect of the present invention, at the time of start of the engine by the manual starter, the ignition timing control means detects an increase in the engine speed to the predetermined engine speed which is lower than the connecting rotation speed of the centrifugal clutch, and retards the ignition timing so as to suppress overshooting of the engine speed above the connecting rotation speed of the centrifugal clutch. Also, the ignition timing control means restores the ignition timing to its normal timing after the lapse of the certain time from the start of retarding the ignition timing so as to enable stabilizing the engine speed at an idling speed.

According to a second aspect of the present invention, in addition to the first aspect, the number of pulses generated by the auxiliary generator coil from the start of retarding the ignition timing is used in place of the predetermined time.

According to the second aspect of the present invention, the number of pulses generated by the auxiliary generator coil from the start of retarding the ignition timing is used in place of the predetermined time. Accordingly, the ignition timing control means can detect the lapse of the certain time from the start of retarding the ignition timing, without using a special timer.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 6 is a diagram for comparing an engine speed characteristic of the present invention and that prior to the invention.

DESCRIPTION OF THE PREFERRED EMBODIMENT

An embodiment of the present invention will be described below with reference to the accompanying drawings.

Figure 1:
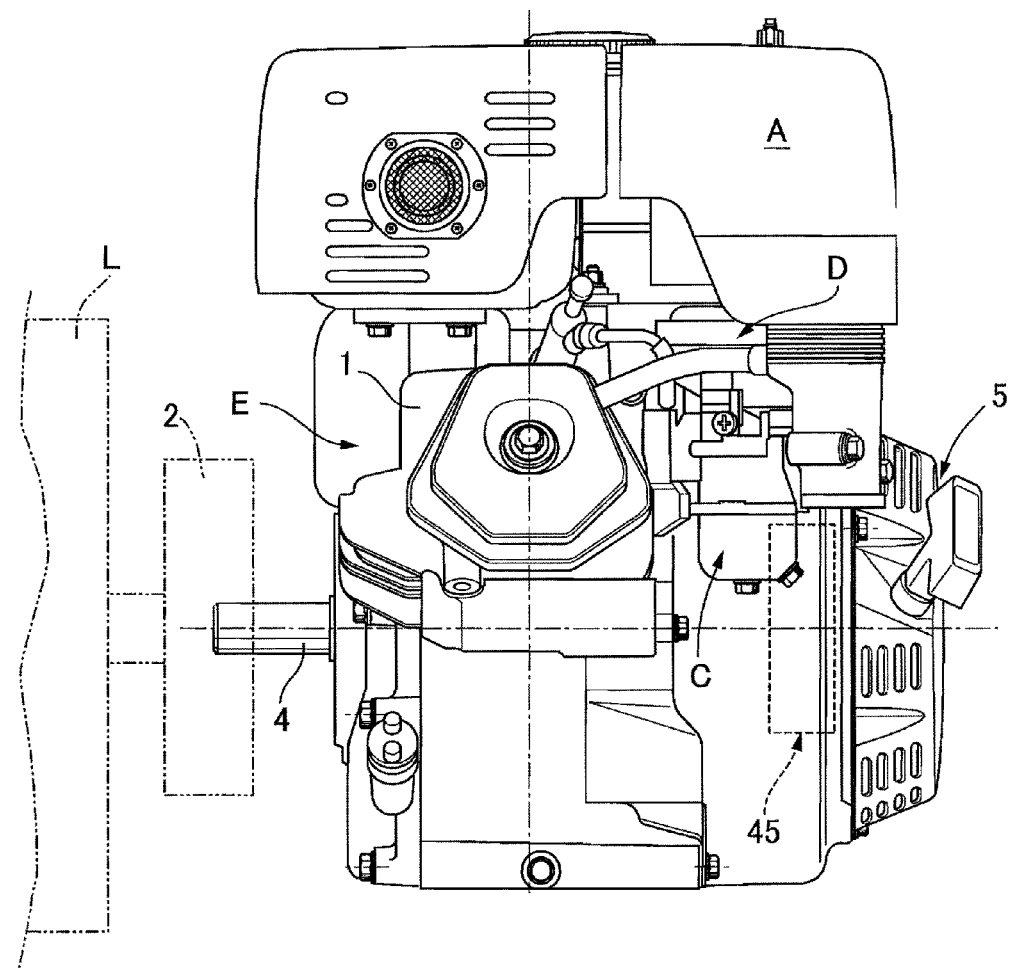
FIG. 1 is a side view of a general-purpose internal combustion engine according to an embodiment of the present invention.

Firstly, as illustrated in FIG. 1, a general-purpose internal combustion engine E is equipped at its front face side with a recoil starter 5 capable of cranking a crankshaft 4, and also, a load device L such as a snow-removal device or the like is connected via a centrifugal clutch 2 to an output end of the crankshaft 4. Also, a carburetor C which supplies an air-fuel mixture formed by intake air from an air cleaner A to a suction port of the internal combustion engine E is attached to a cylinder head 1 of the engine E.

Figure 2:
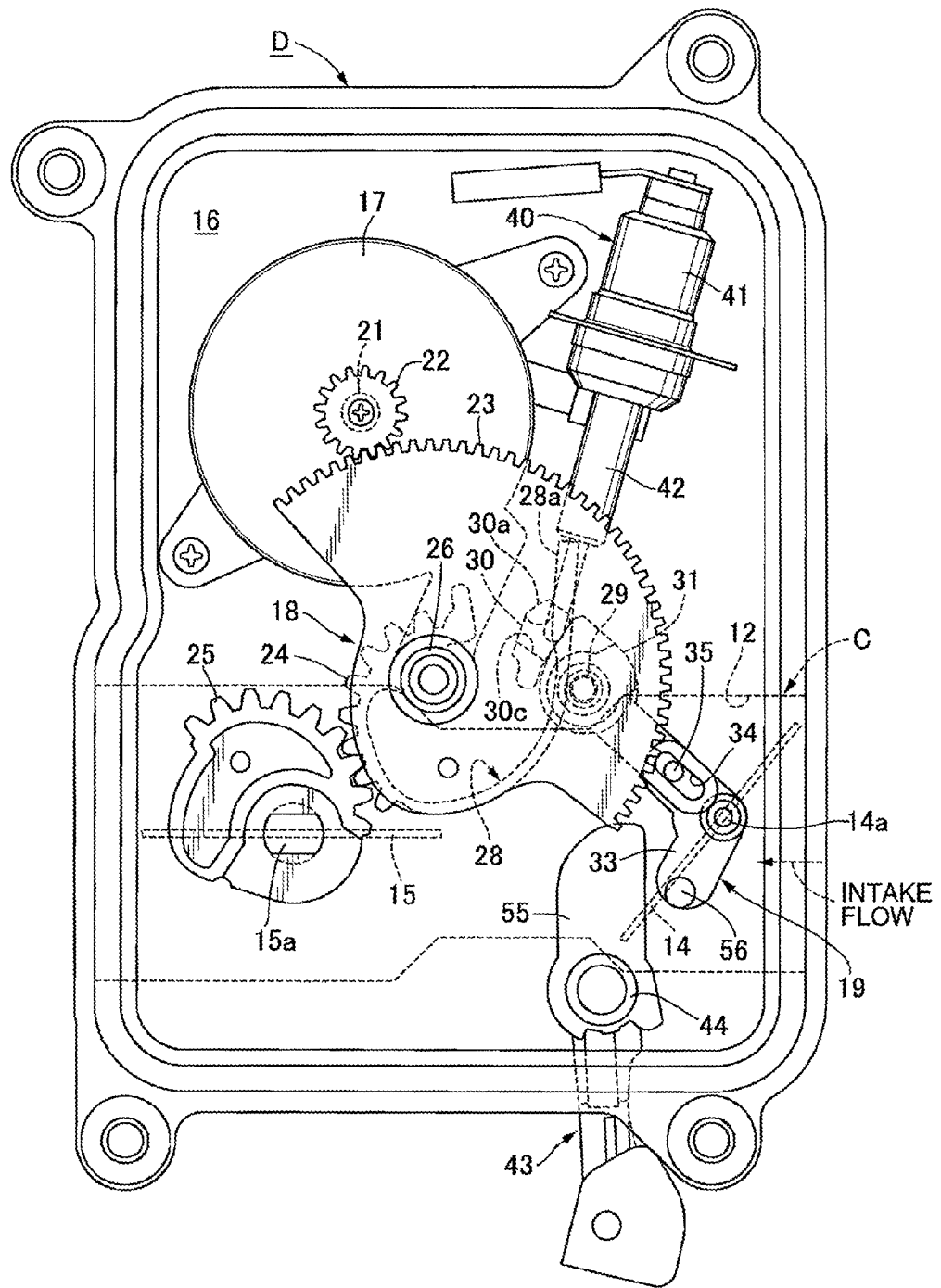
FIG. 2 is a plan view of a throttle and choke control device provided in a carburetor of the internal combustion engine.

As illustrated in FIG. 2, the carburetor C has an intake passage 12 communicating with an intake port of the engine E, and the intake passage 12 is provided with a choke valve 14 and a throttle valve 15 in this order from an upstream side of the intake passage 12, that is, from the air cleaner A side, and a fuel nozzle (unillustrated) is opened to a venturi portion of the intake passage 12 in an intermediate portion between the valves 14, 15. The choke valve 14 and the throttle valve 15 are both configured with butterfly-type valves which are opened and closed by rotation of valve shafts 14a, 15a, respectively.

A throttle and choke control device D for automatically controlling openings of the choke valve 14 and the throttle valve 15 is mounted on an upper portion of the carburetor C. Hereinafter, the valve shaft 14a of the choke valve 14 will be called the choke valve shaft 14a, and the valve shaft 15a of the throttle valve 15 will be called the throttle valve shaft 15a.

Figure 3:
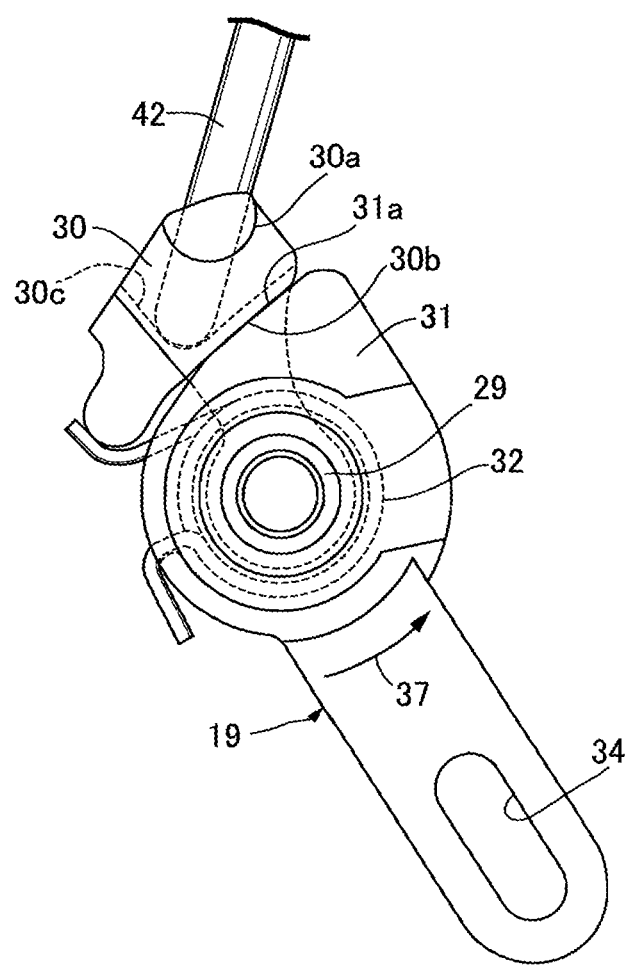
FIG. 3 is an enlarged sectional view of an essential part of FIG. 2.

The throttle and choke control device D will be described with reference to FIGS. 2 and 3.

A casing 16 of the throttle and choke control device D is integrally formed with an upper sidewall of the carburetor C and an upper surface of the casing 16 is opened. The opened surface is normally closed by a cover plate (unillustrated).

The casing 16 houses therewithin a stepping motor 17, a throttle valve opening-closing mechanism 18 arranged between the stepping motor 17 and the throttle valve shaft 15a so as to open or close the throttle valve 15 according to activation of the stepping motor 17, and a choke valve opening-closing mechanism 19 which is driven by an output from the stepping motor 17 so as to open and close the choke valve 14.

The stepping motor 17 is housed and fixed in the casing 16 with a rotor shaft 21 of the stepping motor 17 being parallel to the throttle valve shaft 15a and the choke valve shaft 14a. In addition, the throttle valve opening-closing mechanism 18 includes a pinion gear 22 attached to the rotor shaft 21, a first intermediate gear 23 in mesh with the pinion gear 22, a second intermediate gear 24 integrally formed with the first intermediate gear 23 and having a smaller diameter than that of the first intermediate gear 23, and an output gear 25 attached to the throttle valve shaft 15a so as to in mesh with the second intermediate gear 24 and having a larger diameter than that of the second intermediate gear 24. The first and second intermediate gears 23, 24 are rotatably supported by a first supporting shaft 26 mounted to the casing 16 to be parallel to the rotor shaft 21. The first and second intermediate gears 23, 24 and the output gear 25 are configured of sector gears.

The choke valve opening-closing mechanism 19 includes a cam 28 having, as a cam surface 28a, a concavely curved inner peripheral surface formed on an inner side surface of the first intermediate gear 23, a cam follower 30 rotatably supported by a second supporting shaft 29 provided in the casing 16 in parallel to the first supporting shaft 26, and having a cam sliding contact portion 30a which comes into sliding contact with the cam surface 28a, a first arm 31 having one end portion rotatably supported by the second supporting shaft 29, a relief spring 32 formed of a torsion coil spring and attached to the second supporting shaft 29 to be interposed between the cam follower 30 and the first arm 31, and a second arm 33 fixed to the choke valve shaft 14a and interlockingly connected to the other end of the first arm 31.

The other end side of the first arm 31 extends long in a radial direction of the second supporting shaft 29, and the other end portion of the first arm 31 is provided with a long hole 34 with its major axis oriented in the radial direction of the second supporting shaft 29. Meanwhile, the second arm 33 is bent in a V-shape with the choke valve shaft 14a as the center, and a pin 35 provided at one end portion of the second arm 33 is inserted through the long hole 34 so that the first and second arms 31, 33 are interlockingly connected to each other. Thus, the first arm 31 rotates around the second supporting shaft 29 in a counterclockwise opening direction 37 in FIG. 3 so as to rotate the second arm 33 clockwise, thus enabling rotation of the choke valve 14 in its opening direction.

Also, when the stepping motor 17 operates in a direction in which the throttle valve 15 rotates toward its open side so that the first intermediate gear 23 rotates counterclockwise in FIG. 2, the cam follower 30 rotates counterclockwise in FIG. 2 around the second supporting shaft 29 by bringing the cam sliding contact portion 30a into sliding contact with the cam surface 28a of the cam 28 of the first intermediate gear 23. The relief spring 32 attached to the second supporting shaft 29 exerts a spring force which biases the cam follower 30 to a side on which the cam sliding contact portion 30a of the cam follower 30 comes into sliding contact with the cam surface 28a, that is, in the clockwise direction in FIG. 2, so as to bias the first arm 31 to rotate about the second supporting shaft 29 in the counterclockwise direction in FIG. 2. The cam follower 30 and the first arm 31 are provided with abutment surfaces 30b, 31a, respectively, which abut against each other by the spring force of the relief spring 32.

Thus, when the cam follower 30 rotates counterclockwise in FIG. 2 by rotation of the first intermediate gear 23, the first arm 31 rotates by the spring force of the relief spring 32 in such a way as to follow the cam follower 30. When the first arm 31 rotates clockwise in FIG. 2, that is, in the opening direction of the choke valve 14, with the cam sliding contact portion 30a in sliding contact with the cam surface 28a, only the first arm 31 rotates clockwise in FIG. 2.

Incidentally, as illustrated in FIG. 2, the choke valve shaft 14a is offset to one side from the center of the intake passage 12, and thus, the choke valve 14 when in its fully closed state is in a tilted state in which a side of the choke valve 14 having a larger radius of rotation is located downstream of the intake passage 12 from a side of the choke valve 14 having a smaller radius of rotation. Thus, in a case where the choke valve opening-closing mechanism 19 sets the opening of the choke valve 14 to an opening between full closing and half opening, if intake negative pressure in the internal combustion engine E, which is equal to or more than a certain value, acts on the choke valve 14, the choke valve 14 is opened to a position where a difference between a rotation moment which the intake negative pressure applies to the side of the choke valve 14 having the larger radius of rotation and a rotation moment which the intake negative pressure applies to the side of the choke valve 14 having the smaller radius of rotation is balanced with a rotation moment applied to the first arm 31 by the relief spring 32.

Also, a temperature sensitive actuator 40 which operates according to ambient temperature is housed and fixed in the casing 16. The temperature sensitive actuator 40 includes a case 41 in which wax (unillustrated) is sealed, and a piston 42 slidably fitted in the case 41 to bring an inner end of the piston 42 into contact with the wax and having an outer end protruding outward from the case 41. Accordingly, when the ambient temperature rises, protrusion amount of the piston 42 increases by thermal expansion of the wax. Thus, the outer end of the piston 42 can abut against a pressure receiving portion 30c of the cam follower 30, and thus, when the protrusion amount of the piston 42 is increased so that the piston 42 presses against the pressure receiving portion 30c, the cam follower 30 rotates in the opening direction of the choke valve 14.

Also, the casing 16 is provided with choke valve forced-closing means 43 capable of manually operating, from outside of the casing 16, the choke valve 14 toward its closing side. The choke valve forced-closing means 43 includes an operating lever 55 having an intermediate portion rotatably supported by a third supporting shaft 44 provided in the casing 16, a pressure receiving pin 56 fixedly provided at the other end portion of the second arm 33 in such a way as to face an inner end portion of the operating lever 55 so as to be capable of abutting against the inner end portion thereof, and a return spring (unillustrated) which biases the operating lever 55 to rotate so as to separate from the pressure receiving pin 56. When the operating lever 55 is rotated against a bias force of the return spring so as to press the pressure receiving pin 56, the second arm 33 can be forcibly rotated in a closing direction of the choke valve 14.

Figure 4:
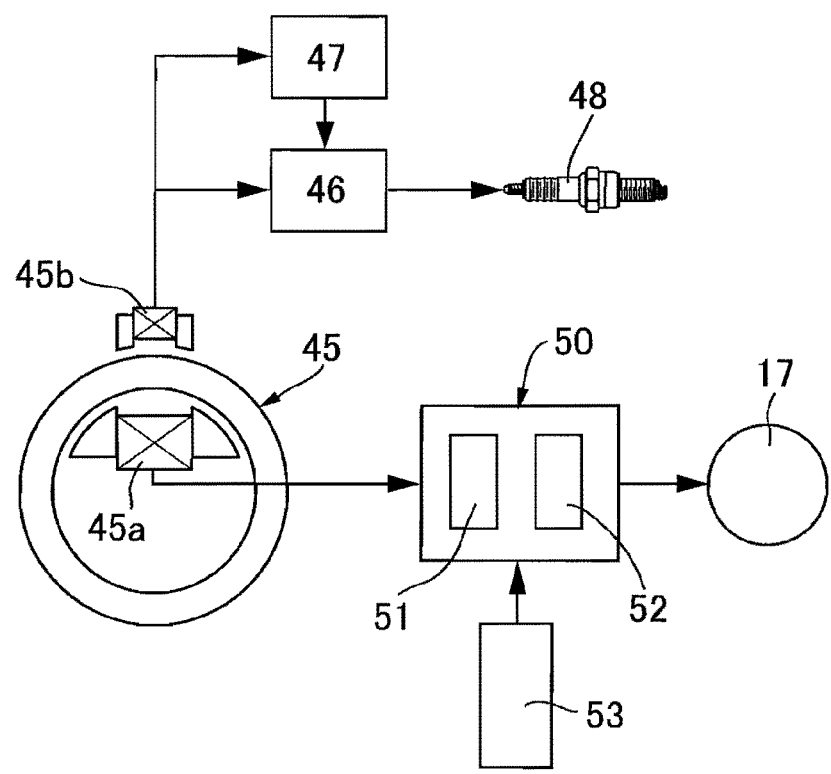
FIG. 4 is a diagram showing a generator of the internal combustion engine and an electric circuit related to the generator.

As illustrated in FIGS. 1 and 4, the internal combustion engine E is not equipped with a battery but includes a magnet type generator 45 as a power supply. The generator 45 is driven by the crankshaft 4 and includes a main generator coil 45a and an auxiliary generator coil 45b.

An output from the auxiliary generator coil 45b is inputted to an ignition device 46 and ignition timing control means 47, and an output from the ignition timing control means 47 is inputted to the ignition device 46. The ignition device 46 is switchable between its operating and non-operating states, and the ignition device 46 when in the operating state applies its output to a spark plug 48 of the internal combustion engine E.

An output from the main generator coil 45a is inputted to an electronic control unit 50. The electronic control unit 50 includes a power supply circuit 51 and a pulse arithmetic circuit 52 and an engine speed setting device 53 is connected to the electronic control unit 50. The pulse arithmetic circuit 52 controls the stepping motor 17 to achieve a balance between a desired engine speed set by the engine speed setting device 53 and the number of pulses generated by the main generator coil 45a, which are obtained via the power supply circuit 51, so as to open and close the throttle valve 15, thereby controlling an output from the internal combustion engine E. Accordingly, an engine speed corresponds to the desired engine speed set by the engine speed setting device 53. Thus, when the ignition device 46 is placed in the non-operating state to stop ignition of the spark plug 48, the electronic control unit 50 rotates the stepping motor 17 to a full-open position of the throttle valve 15 by using an output by inertial rotation of the generator 45.

Next, an operation of the embodiment will be described.

As mentioned above, the electronic control unit 50 rotates the stepping motor 17 to the full-open position of the throttle valve 15 by using the output by the inertial rotation of the generator 45 immediately before stop of rotation of the internal combustion engine E. Accordingly, when the engine E is in its stopped state, the throttle valve 15 is held in the full-open position, and the choke valve 14 is held at an opening according to whether the ambient temperature is high or low, by the temperature sensitive actuator 40.

When starting the internal combustion engine E, first, an idling speed as the desired engine speed is set in the engine speed setting device 53. Of course, the idling speed is lower than a connecting rotation speed of the centrifugal clutch 2. Then, when the crankshaft 4 is cranked by operation of the recoil starter 5 in order to start the internal combustion engine E, an air-fuel mixture formed in the intake passage 12 is sucked into the engine E accordingly, and first, the ignition device 46 operates by electric power generated by the auxiliary generator coil 45b of the generator 45 so as to generate a spark in the spark plug 48, thereby making the engine E in a state of complete explosion. Then, the throttle valve 15 is in the full-open position, so that, the engine E sucks a large amount of air-fuel mixture so as to sharply increase the engine speed, thereby becoming in a started state. At this stage, an output voltage from the main generator coil 45a of the generator 45 rises sufficiently to place the electronic control unit 50 in an operating state. Thus, the pulse arithmetic circuit 52 of the electronic control unit 50 controls the stepping motor 17 so as to achieve a balance between the idling speed set by the engine speed setting device 53 and the number of pulses generated by the main generator coil 45a, which are obtained via the power supply circuit 51, thereby closing the throttle valve 15 to reduce the engine speed to the idling speed.

However, the engine speed tends to overshoot above the connecting rotation speed of the centrifugal clutch 2 before the engine speed is stabilized at the idling speed, as indicated by a dashed line (showing an engine speed characteristic prior to the invention) in FIG. 6, and this overshooting causes the engine E to stall by connection shock of the centrifugal clutch 2.

Figure 5:
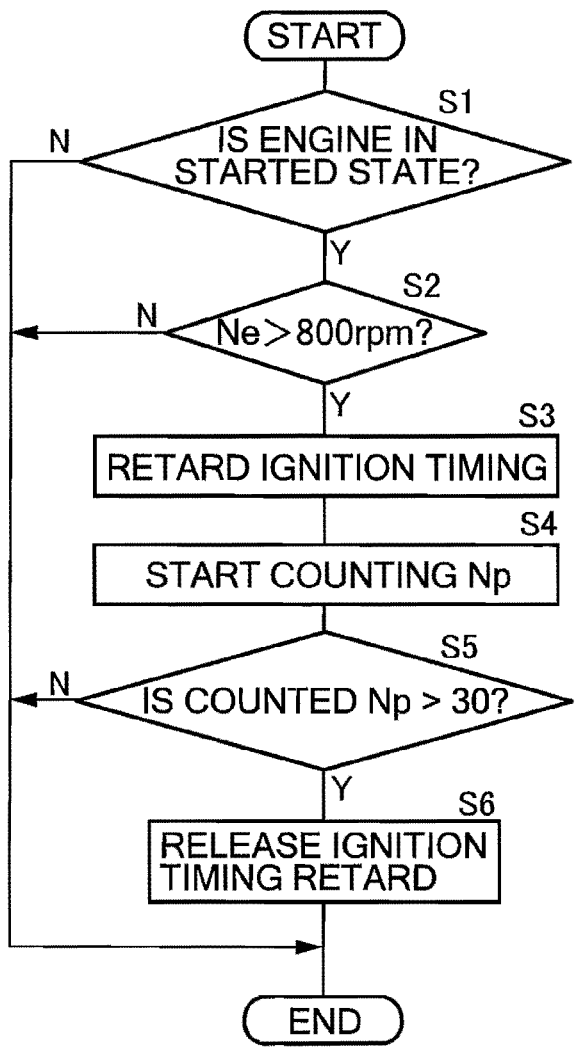
FIG. 5 is a flowchart illustrating an operating status of ignition timing control means in FIG. 4.

In the present invention, therefore, the ignition timing control means 47 operates in the following manner according to a flowchart of FIG. 5. Specifically, first, at step 1, a decision is made as to whether or not the engine E is now in the started state, and, if the decision is made that the engine E is in the started state (YES), processing goes to step 2, and there, a decision is made as to whether or not an engine speed Ne detected from an output of the auxiliary generator coil 45b is increased to or above a predetermined engine speed (for example, 800 rpm) which is lower than the connecting rotation speed of the centrifugal clutch 2, and, if the decision is made that the engine speed Ne is increased to or above the predetermined engine speed (YES), the processing goes to step 3, and there, the ignition device 46 is controlled so as to retard an ignition timing. As a result, as indicated by a solid line in FIG. 6, torque of the engine E decreases immediately to suppress the above-described overshooting of the engine speed Ne, and the engine speed Ne moves toward the idling speed without exceeding the connecting rotation speed of the centrifugal clutch 2.

Then, the processing goes to step 4, and there, the ignition timing control means 47 starts counting pulses generated by the auxiliary generator coil 45b from start of retarding the ignition timing, and then, at step 5, a decision is made as to whether or not the number of the counted pulses reaches or exceeds a predetermined number (for example, 30 pulses), and, if the decision is made that the number of the counted pulses reaches or exceeds the predetermined number (YES), in other words, if the decision is made that a substantially certain time t has elapsed from the start of retarding the ignition timing, the processing goes to step 6, and there, the ignition device 46 is controlled so as to restore the ignition timing to its normal timing.

Thus, as indicated by the solid line in FIG. 6, the engine speed Ne can be stabilized at the idling speed without exceeding the connecting rotation speed of the centrifugal clutch 2.

After starting the engine, the engine speed setting device 53 is operated to activate the stepping motor 17 as in the conventional way so as to appropriately open and close the throttle valve 15 and the choke valve 14, thereby obtaining a desired engine speed to drive the load device L.

Incidentally, the present invention is not limited to the above-described embodiment and various design changes can be made to the present invention without departing from the gist of the invention. For example, the recoil starter may be replaced by a kick starter.

What is claimed is:

1. A control apparatus for a general-purpose internal combustion engine having an output shaft connected via a centrifugal clutch to a load device, the control apparatus comprising a manual starter, a carburetor having a throttle valve for opening and closing an intake passage, and a stepping motor for controlling opening and closing of the throttle valve, in which the internal combustion engine is started from a full-open position of the throttle valve and, after the start of the engine, the stepping motor is activated so as to close the throttle valve from the full-open position, wherein the control apparatus further comprises:
a generator as a power supply of the engine, the generator including a main generator coil for supplying power to the stepping motor, and an auxiliary generator coil for supplying power to an ignition device of the engine, the auxiliary generator coil being a separate coil from the main generator coil; and ignition timing control means for, when starting the engine by the manual starter, detecting that an engine speed of the engine is equal to or more than a predetermined engine speed which is equal to or less than a connecting rotation speed of the centrifugal clutch, and retarding an ignition timing of the engine so as to suppress increase in the engine speed of the engine to less than the connecting rotation speed of the centrifugal clutch, and also for restoring the ignition timing to its normal timing after a lapse of a predetermined time from start of retarding the ignition timing, wherein the control apparatus further comprises an electronic control unit configured to receive the power from the main generator coil to control the stepping motor, and after the lapse of the predetermined time from the start of retarding the ignition timing, an output voltage from the main generator coil rises sufficiently to place the electronic control unit in an operating state to control the stepping motor.

2. The control apparatus for the general-purpose internal combustion engine according to claim 1, wherein the number of pulses generated by the auxiliary generator coil from the start of retarding the ignition timing is used in place of the predetermined time.

* * * * *